United States Patent [19]

Tomiyoshi et al.

[11] Patent Number: 5,347,396
[45] Date of Patent: Sep. 13, 1994

[54] PHOTOVIDEO CAMERA

[75] Inventors: Toshio Tomiyoshi, Saitama; Tetsuya Yagi; Masami Torizuka, both of Kanagawa; Kenichi Hamano; Mitsuru Hachiya, both of Saitama; Motoshi Mizoguchi, Kanagawa, all of Japan

[73] Assignee: Sony Corporation, Tokyo, Japan

[21] Appl. No.: 164,679

[22] Filed: Dec. 9, 1993

Related U.S. Application Data

[63] Continuation of Ser. No. 819,778, Jan. 13, 1992, abandoned.

[30] Foreign Application Priority Data

Jan. 16, 1991 [JP] Japan .................................. 3-015002

[51] Int. Cl.$^5$ .................................................. H04N 1/04
[52] U.S. Cl. ..................................... 358/479; 359/679; 359/687; 348/96
[58] Field of Search .................. 358/479, 909; 359/679, 359/687, 688; 355/21, 27, 39, 40, 45; 345/295

[56] References Cited

U.S. PATENT DOCUMENTS

| | | | |
|---|---|---|---|
| 4,310,231 | 1/1982 | Konishi et al. .................. | 355/21 |
| 4,527,201 | 7/1985 | Cappels .......................... | 358/224 |
| 4,769,678 | 9/1988 | Komoda et al. ................. | 355/39 |
| 4,783,685 | 11/1988 | Kahle .............................. | 355/45 |
| 4,820,028 | 4/1989 | Suda et al. ...................... | 359/688 |
| 4,842,395 | 6/1989 | Sato et al. ....................... | 359/679 |
| 4,885,605 | 12/1989 | Fujita et al. .................... | 355/45 |
| 5,007,719 | 4/1991 | Hasegawa ....................... | 359/679 |
| 5,065,250 | 11/1991 | Takanashi et al. .............. | 358/909 |

FOREIGN PATENT DOCUMENTS

| | | |
|---|---|---|
| 0250368 | 12/1987 | European Pat. Off. . |
| 1965241 | 7/1971 | Fed. Rep. of Germany . |
| 3446926 | 7/1985 | Fed. Rep. of Germany . |
| 8401483 | 4/1984 | PCT Int'l Appl. . |

Primary Examiner—Richard E. Chilcot, Jr.
Assistant Examiner—Rafael Bacares
Attorney, Agent, or Firm—Lewis H. Eslinger; Jay H. Maioli

[57] ABSTRACT

A photovideo camera takes visual images formed on negative films and/or positive films to obtain video signals corresponding to the visual images. The camera unit of the photovideo camera can be focused after determining a desired angle of view by zooming, without changing the desired angle of view. In focusing the lens unit, only the master lens of the focusing lens system of the lens unit is moved.

7 Claims, 8 Drawing Sheets

PHOTOVIDEO CAMERA

This is a continuation of application Ser. No. 07/819,778 filed Jan. 13, 1992 now abandoned.

BACKGROUND OF THE INVENTION

1. Field of the Invention

The present invention relates to a photovideo camera and, more specifically, to a photovideo camera capable of determining a desired angle of view by zooming before focusing, and capable of focusing without changing the desired angle of view.

2. Description of the Prior Art

Recently, so-called photovideo cameras have widely been used for displaying on a monitor or for recording on a video tape a visible image formed on a negative film or a positive film by converting the visible image into video signals.

The photovideo camera comprises a film stage for supporting a film, such as a negative film or a positive film, a light source disposed under the film stage to illuminate the film supported on the film stage, a lens unit for focusing the light projected by the light source through the visible image, a solid-state image pickup device, such as a CCD (charge coupled device), for converting the image formed by the lens unit into corresponding video signals, a video signal inverting circuit for inverting the video signal to provide positive video signals when the visible image is negative, and a turning mechanism for turning the solid-state image pickup device in a fixed range in a plane parallel to its focal plane.

Figure 5:
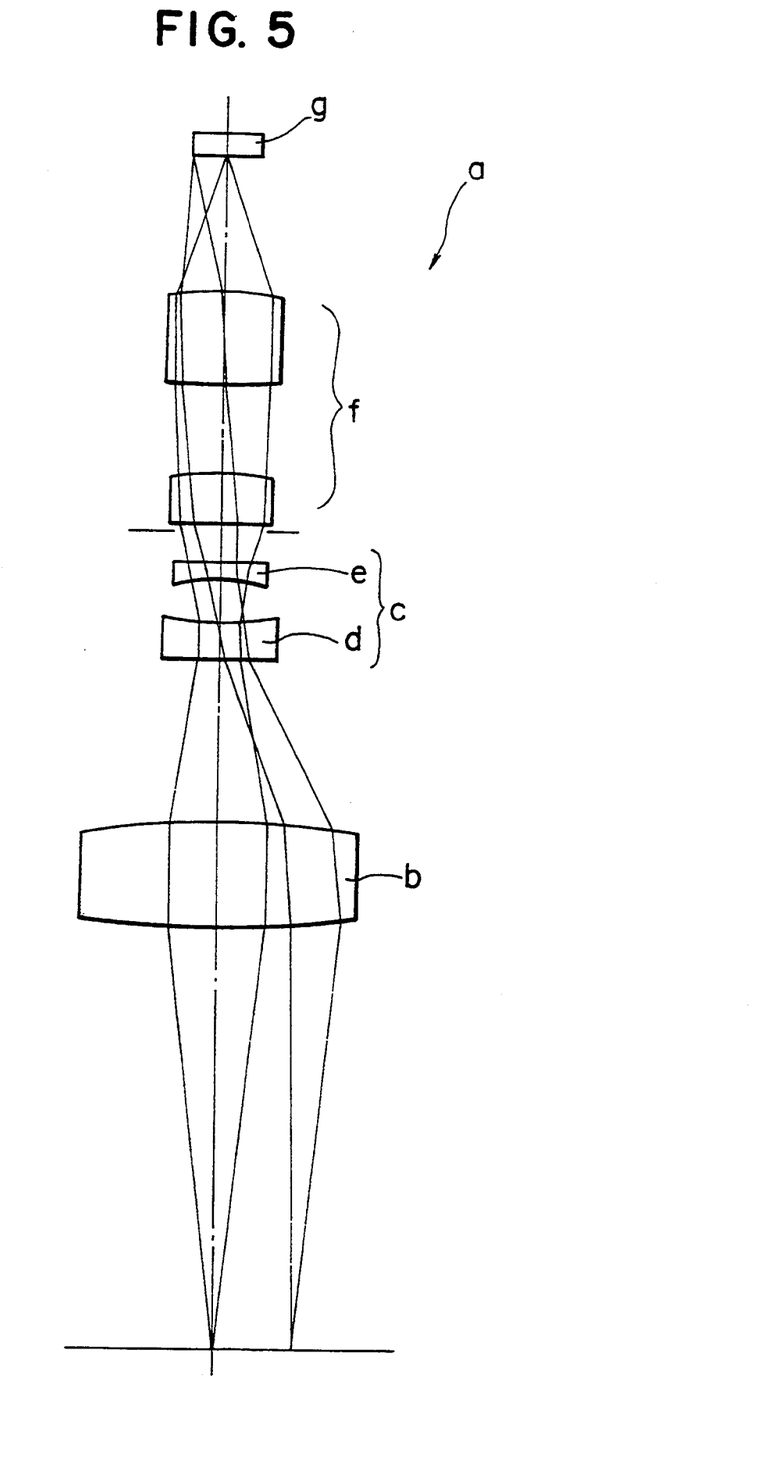
FIG. 5 is a diagrammatic view of a lens unit incorporated into a conventional photovideo camera in a standard state.
Figure 6:
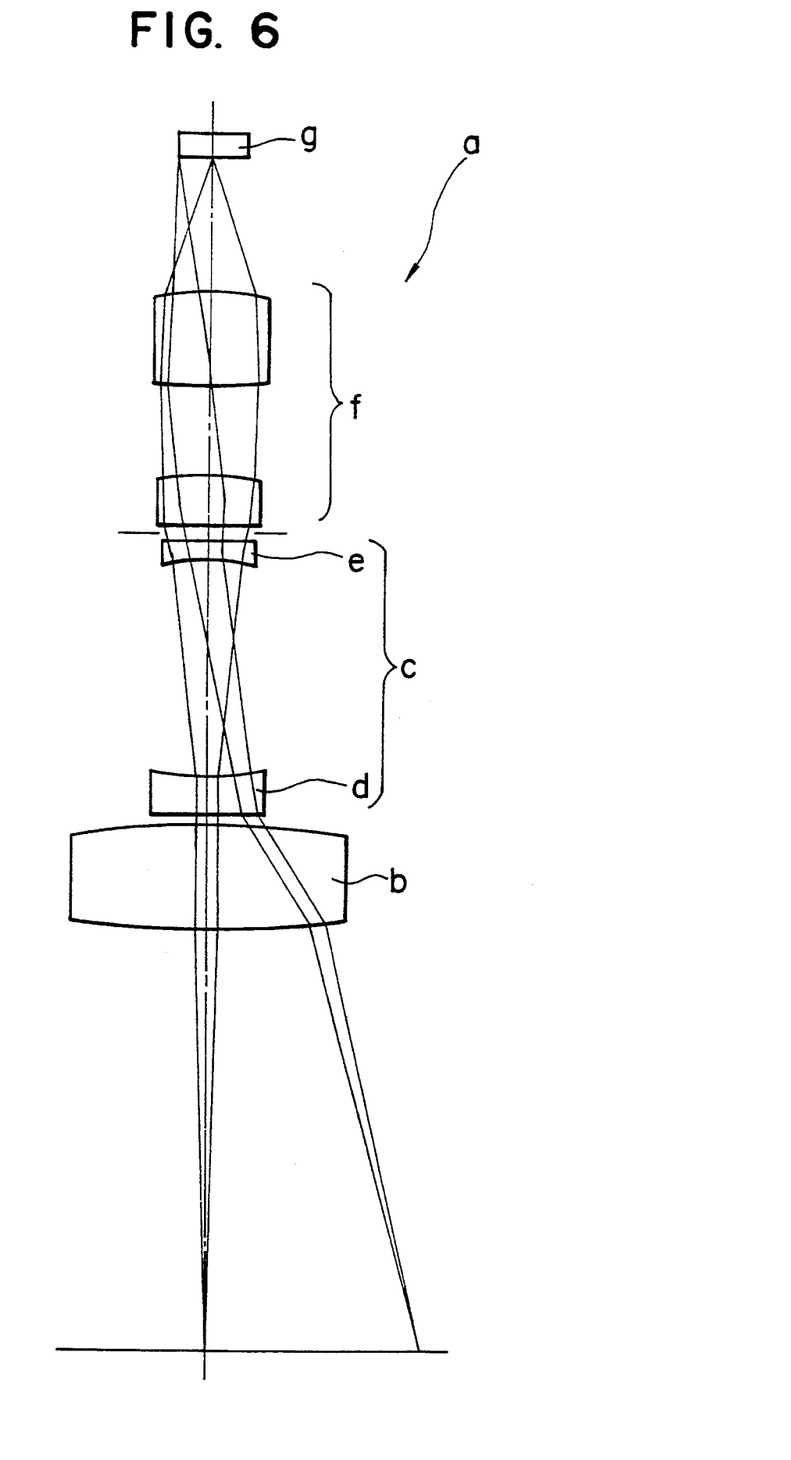
FIG. 6 is a diagrammatic view of the lens unit of the conventional photovideo camera in a wide-angle state.
Figure 7:
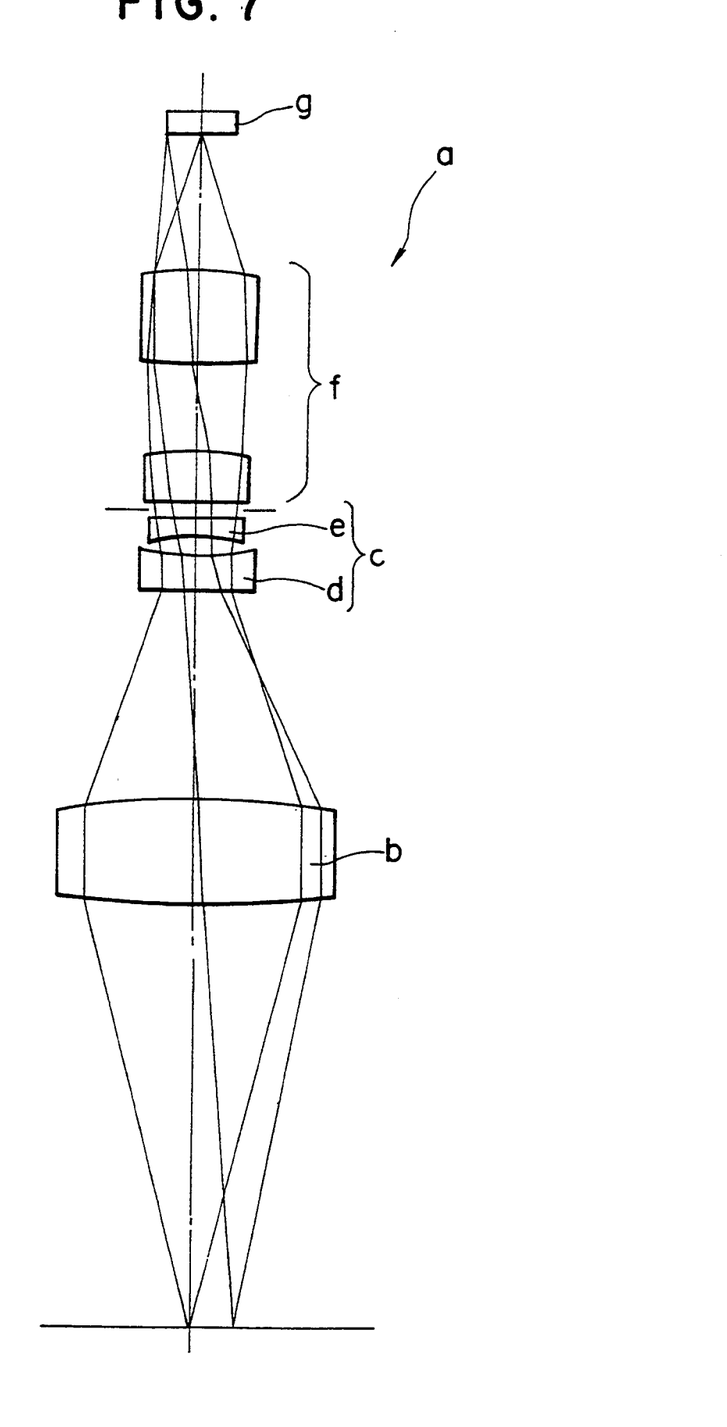
FIG. 7 is a diagrammatic view of the lens unit of the conventional photovideo camera in a telephoto state.

The lens unit has a zoom lens system for varying magnification, and a focusing lens system for focusing. Generally, the front lens, namely, a group of lenses on the side of the object, of the focusing lens system is moved along the optical axis for focusing. Such a focusing system is called an outer focusing system. FIGS. 5 to 7 show a lens unit a of an outer focusing system. As shown in FIGS. 5 to 7, a front lens b is held for movement along the optical axis in the lower end of a lens barrel, not shown. A zoom lens system c consists of a variator d disposed above the front lens b, and a compensator e disposed above the variator d. The variator d and the compensator e are held individually for movement along the optical axis in the lens barrel. A relay lens system f is held fixedly above the compensator e in the lens barrel to focus an image transmitted through the compensator e on the focal surface of a solid-state image pickup device g disposed above the relay lens system f. The front lens b, the variator d, the compensator e and the relay lens system f are arranged with their optical axes in alignment with the optical axis of the photovideo camera. The solid-state image pickup device g is disposed with its focal surface extended perpendicularly to the optical axis and with its center on the optical axis of the photovideo camera.

The front lens b is moved along the optical axis for focusing. For example, when the lens unit a is in a front focus state, namely, when the lens unit a is focused on an object nearer to the lens unit than a desired object, the front lens b is moved upward for focusing, and when the lens unit a is in a rear focus state, namely, when the lens unit a is focused on an object further from the lens system than the desired object, the front lens b is moved downward.

The variator d and the compensator e are moved individually along the optical axis for zooming. The movement of the variator d changes magnification, and the movement of the compensator corrects the deviation of the focus point. Magnification is dependent on the distance between the variator d and the front lens b.

Suppose that the lens system a is in a standard state where the front lens b, the variator d and the compensator e are disposed as shown in FIG. 5. Then, the lens unit a is brought to a wide-angle state when the variator d is moved downward (toward the front lens b) from the position in the standard state shown in FIG. 5 as shown in FIG. 6. When the variator d is moved toward the front lens b, the compensator e is moved slightly upward (away from the front lens b) to correct the deviation of the focus point resulting from the downward movement of the variator d. When the variator d is moved upward (away from the front lens b) from the position in the standard state, the lens unit a is brought to a telephoto state as shown in FIG. 7, in which magnification is increased. When the variator d is moved upward, the compensator e is moved slightly upward to correct the deviation of the focus point resulting from the upward movement of the variator d.

The variator d and the compensator e are interlocked with each other so that the compensator e is moved to correct the deviation of the focus point when the variator d is moved. Accordingly, once the lens unit a is focused, theoretically, it is not necessary to focus the lens unit a again after zooming.

However, in actual practice some correction of the focus point is necessary after zooming. Since the out of focus condition is more conspicuous in a telephoto state than in a wide-angle state, the lens unit a must be focused again if the lens unit a is zoomed up after focusing. The recent trend toward greater zoom ratio has further enhanced the importance of focus correction after zooming.

Since the films to be mounted on the film holder of the photovideo camera are different from each other in curvature on the film holder, the distance between the film mounted on the film holder and the front lens b changes when the film is changed. Therefore, in most cases, the focus of the lens unit a must be adjusted every time the film is changed.

Figure 8:
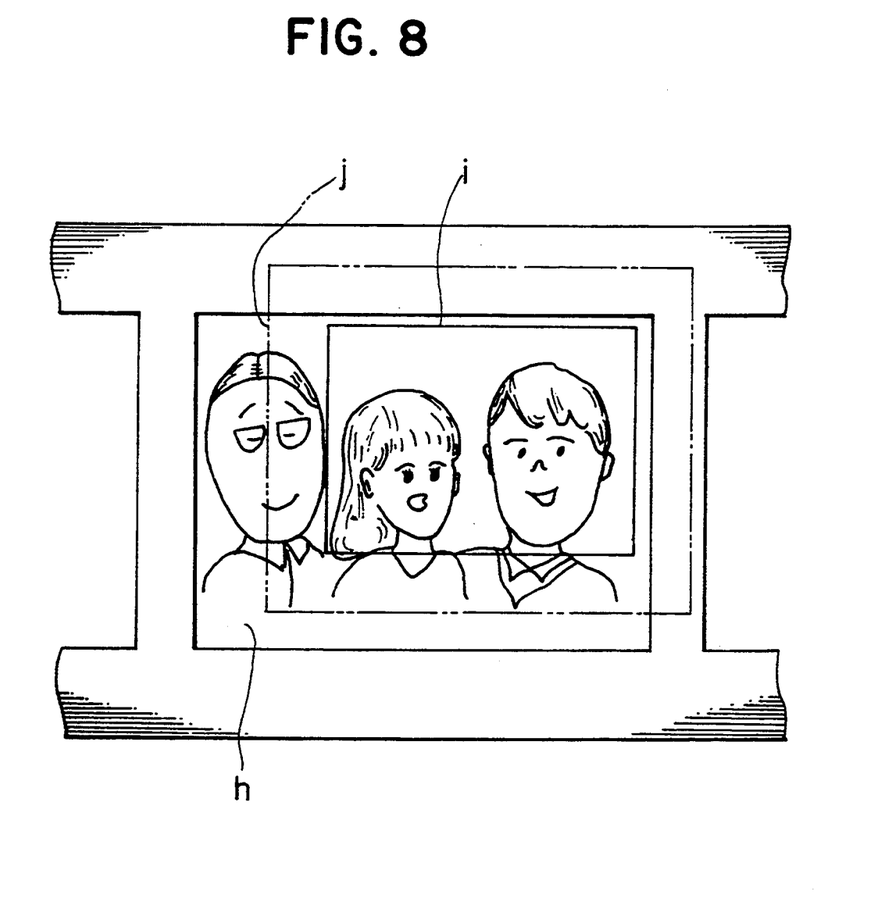
FIG. 8 is a pictorial view of assistance in explaining problems in the conventional photovideo camera.

The conventional photovideo camera of an outer focusing system has problems specific thereto. If the front lens b is moved along the optical axis for focusing after enlarging a visible image on a film in a desired angle of view for trimming, the desired angle of view changes, which is due to the change of the magnification resulting from the change of the distance between the front lens b and the variator d. Therefore, if the front lens b is moved for focusing after trimming the visible image on a film h so that an area i surrounded by thick solid lines in FIG. 8 is included in a desired angle of view, the desired angle of view is changed to include an area j surrounded by alternate long and two short dashes lines in FIG. 8.

SUMMARY OF THE INVENTION

Accordingly, it is an object of the present invention to provide a photovideo camera provided with a lens unit having a master lens capable of being moved for focusing to solve the foregoing problems in the conventional photovideo camera.

In focusing the lens unit of a photovideo camera in accordance with the present invention, only the master lens is moved and hence the relative positions of the component lenses of the front lens and the zoom lens unit need not be changed for focusing. Accordingly, a desired angle of view set before focusing is not changed even if the lens unit is focused after setting the desired angle of view.

According to one aspect of the present invention there is provided A photovideo camera for taking a visible image formed on a developed negative film and/or a positive film comprising:

a film stage for supporting the film;

a main unit containing a lens unit, a solid-state pickup device and electric circuits;

said lens unit comprising a lens barrel, a front lens fixedly held in said lens barrel at the lower end of said lens barrel, a zoom lens system held in said lens barrel above said front lens, and a relay lens system held in said lens barrel above said zoom lens system, said relay lens system comprising a front component lens fixedly held in the lens barrel above a compensator, a rear component lens fixedly held in the upper end of said lens barrel, and a master lens disposed for movement along the optical axis in said lens barrel between said front component lens and said rear component lens, in which the master lens of said relay lens system is shifted for focusing; and a column supporting said main unit with an appropriate distance between said film stage and the lens surface of said main unit.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENT

Figure 1:
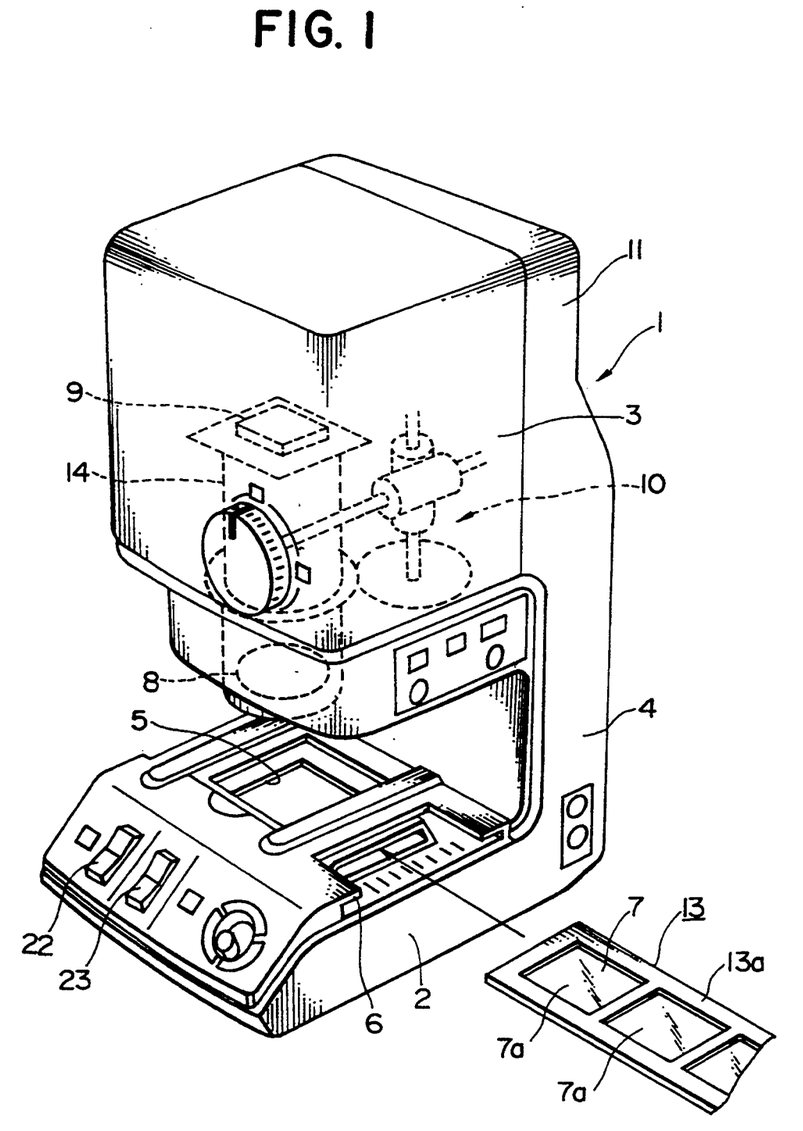
FIG. 1 is a perspective view of a photovideo camera in a preferred embodiment according to the present invention.

Referring to FIG. 1, a photovideo camera 1 in a preferred embodiment according to the present invention comprises a film stage 2 for supporting a film, a main unit 3 comprising a lens unit, a solid-state pickup device and electric circuits, and a column 4 supporting the main unit 3 with an appropriate distance between the film stage 2 and the lens surface of the main unit 3. A light source, not shown, is contained in the film stage 2 to project light upward through a transparent window 5. The film stage 2 is provided in its upper surface with a guide 6 for guiding a film holder mounted on the film stage 2 for lateral sliding movement.

The main unit 3 has a box-shaped housing 11 containing a lens unit 8 for optically transmitting light projected through a visible image formed on a film 7 mounted on the film stage 2, a solid-state pickup device 9 for converting light signals representing the visible image formed on the film 7 transmitted thereto through the lens unit 8 into video signals, electric circuits for processing the video signals, such as amplifying the video signals (not shown), and a turning mechanism 10 (only a portion thereof is shown) for turning the solid-state pickup device 9 in a plane parallel to its focal plane to turn the visible image formed on the film 7 relative to the solid-state pickup device 9. The rear end of the main unit 3 is joined to the column 4 joined integrally to and extending upright from the rear end of the film stage 2 so that the front lens 12 of the lens unit 8 is disposed directly above the transparent window 5.

A film holder 13 has a shape formed by arranging frames in a line. The film holder 13 has an upper frame and a lower frame for holding a film 7 therebetween. The film holder 13 is provided with apertures 13a of a size substantially equal to that of the frames 7a of the film 7. The film 7 is held by the film holder 13 with the frames 7a thereof located in the apertures 13a, respectively, so that the frames 7a of the film 7 can be seen from either the front side or the back side of the film 7.

The film holder 13 holding the film 7 is inserted in the guide 6 of the film stage of the photovideo camera 1 for lateral movement along the guide 6 on the film stage 2. The film holder 13 is located so that each frame 7a of the film is located directly opposite the transparent window 5 of the film stage 2 for illumination by the light source.

The photovideo camera 1 supports the film holder 13 holding the film 7 on the film stage 2, illuminates the frame 7a of the film 7 located directly opposite to the transparent window 5 by the light source, focuses the light transmitted through the frame 7a of the film 7 on the focal plane of the solid-state pickup device 9 by the lens unit 8, and converts the visible image of the frame 7a into video signals.

Figure 2:
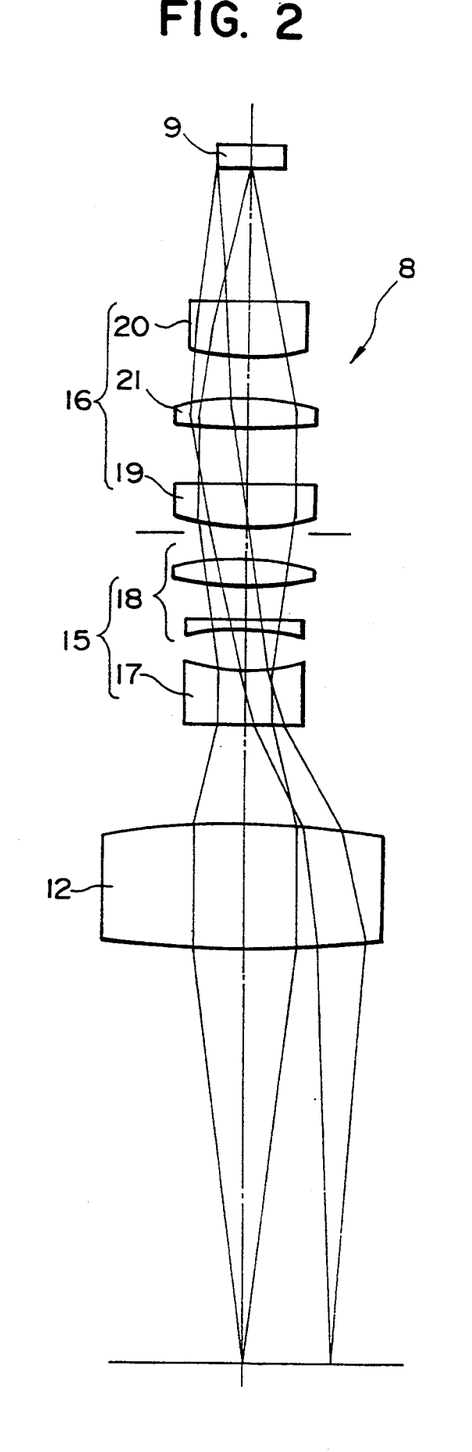
FIG. 2 is a diagrammatic view of a lens unit incorporated into the photovideo camera of FIG. 1 in a standard state.

The lens unit 8 is held by a cylindrical lens barrel 14 with the respective optical axes of the component lenses thereof in alignment with the optical axis of the lens unit 8. As shown in FIG. 2, the lens unit 8 comprises the front lens 12 fixedly held in the lens barrel 14 at the lower end of the lens barrel 14, a zoom lens system 15 held in the lens barrel 14 above the front lens 12, and a relay lens system 16 held in the lens barrel 14 above the zoom lens system 15.

The zoom lens system 15 consists of a variator 17 and a compensator disposed above the variator 17. The variator is moved along the optical axis toward or away from the front lens 12 to change magnification. The compensator 18 corrects the deviation of a focus point resulting from the movement of the variator 17. The variator 17 and the compensator 18 are interlocked with each other so that the compensator 18 moves individually relative to the variator 17 when the variator 17 is moved.

The relay lens system 16 comprises a front component lens 19 fixedly held in the lens barrel 14 above the compensator 18, a rear component lens 20 fixedly held in the upper end of the lens barrel 14, and a master lens 21 disposed for movement along the optical axis in the lens barrel 14 between the front component lens 19 and the rear component lens 20.

In zooming the lens unit 8 for deciding a magnification, the variator 17 is moved along the optical axis and the compensator 18 is moved accordingly along the optical axis to correct the deviation of the focus point. The magnification of the zoom lens system 15 varies in proportion to the distance between the variator 17 and the front lens 12.

Figure 3:
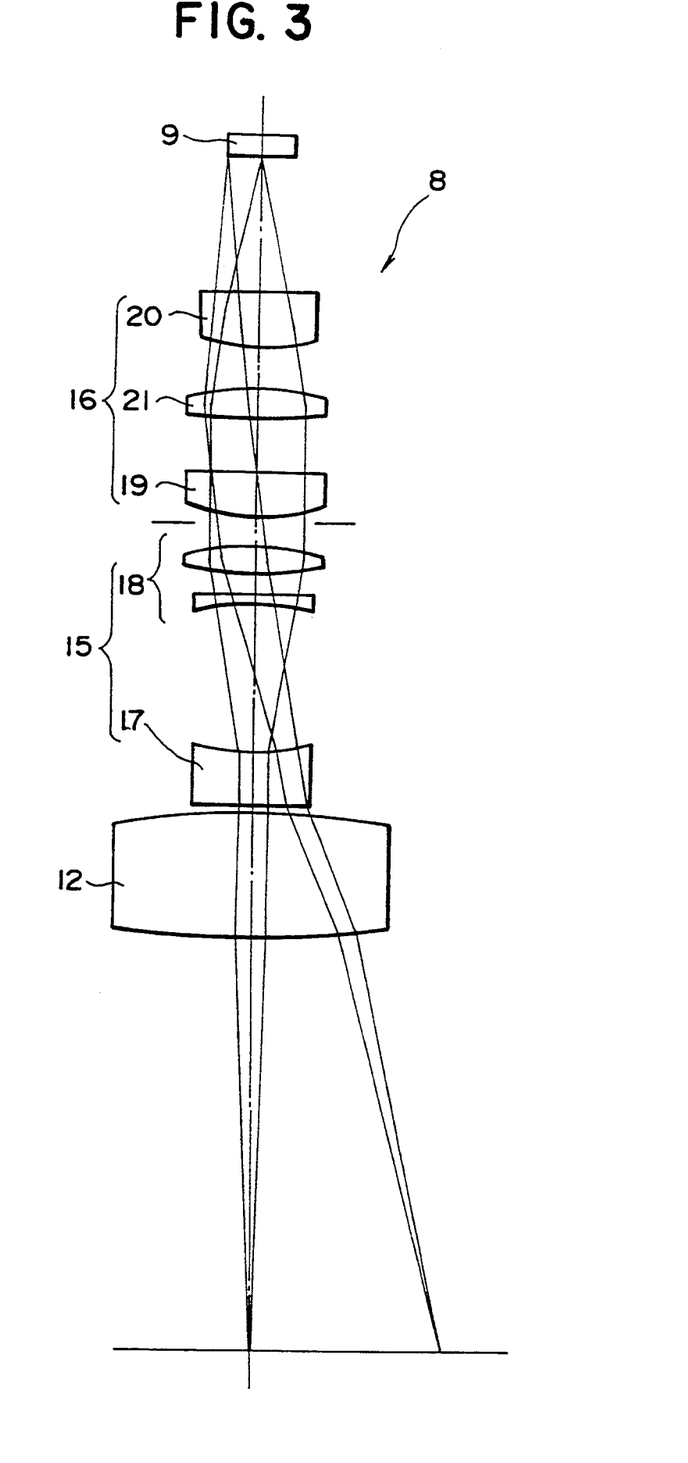
FIG. 3 is a diagrammatic view of the lens unit of the photovideo camera of FIG. 1 in a wide-angle state.
Figure 4:
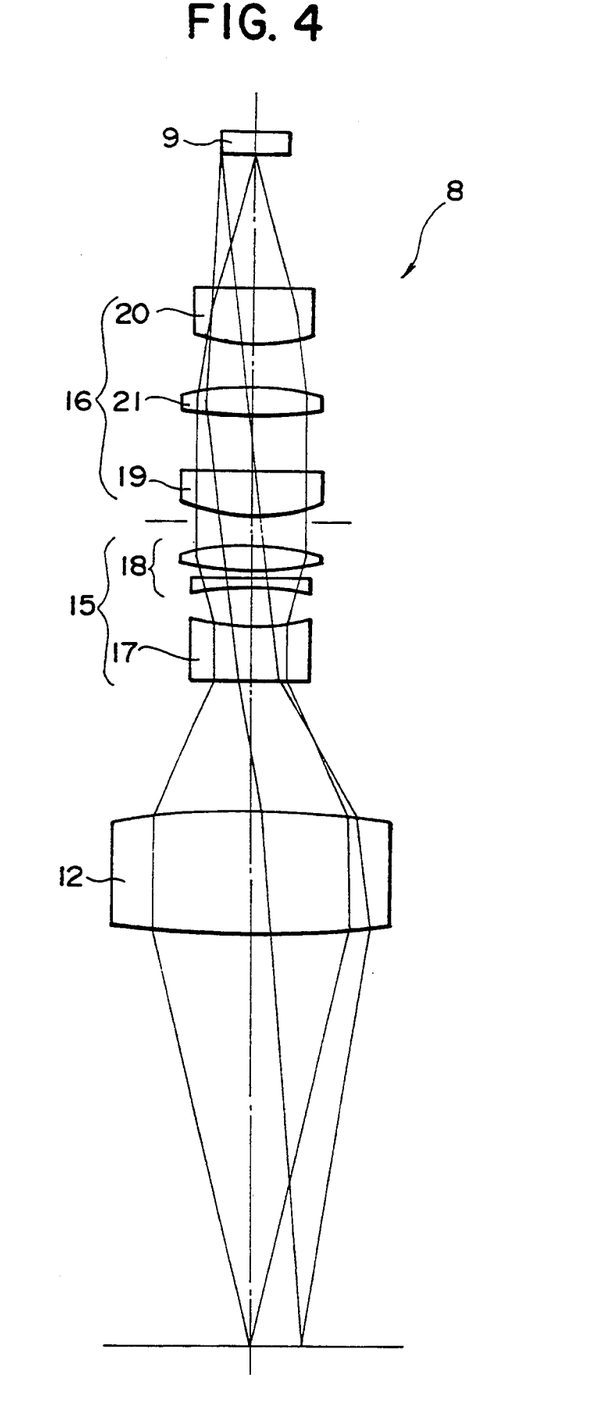
FIG. 4 is a diagrammatic view of the lens unit of the photovideo camera of FIG. 1 in a telephoto state.

Suppose that the front lens 12, the variator 17 and the compensator 18 are in a positional relation as shown in FIG. 2 when the lens system 8 is in a standard state. When the variator 17 is moved downward, namely, when the variator 17 is moved toward the front lens 12 as shown in FIG. 3, from the position in the standard state, the magnification is reduced and the lens system 8 is brought to a wide-angle state. When the lens system 8 is brought from the standard state to the wide-angle state, the compensator 18 moves slightly upward to correct the deviation of the focus point resulting from the downward movement of the variator 17. When the variator 17 is moved upward, namely, when the variator 17 is moved away from the front lens 12 as shown in FIG. 4, from the position in the standard state, the magnification is increased and the lens unit 8 is brought from the standard state to a telephoto state. When the lens unit 8 is brought from the standard state to the telephoto state, the compensator 18 moves slightly upward to correct the deviation of the focus point. The variator 17 and the compensator 18 are interlocked with each other so that the compensator 18 is moved so as to correct the deviation of the focus point when the variator 17 is moved.

In focusing the lens unit 8, only the master lens 21 is moved along the optical axis and the positional relation between the front lens 12 and the variator 17 remains unchanged. Accordingly, the angle of view is not changed by focusing.

The master lens 21 is moved for focusing, and the variator 17 and the compensator 18 are moved for zooming by an electric lens driving mechanism, not shown.

Referring again to FIG. 1, a focusing button 22 and a zooming button 23 are provided on the front surface of the film stage 2. When the focusing button 22 is operated, the lens driving mechanism is driven to move the master lens 21 downward or upward for focusing When the zooming button 23 is operated, the lens driving mechanism is driven to move the variator 17 upward or downward for zooming.

As is apparent from the foregoing description, the photovideo camera in accordance with the present invention moves only the master lens for focusing and holds the rest of the lenses, i.e., the front lens and the component lenses of the zooming lens system, stationary. Accordingly, the magnification and the angle of view determined by zooming the lens unit are not changed by focusing and, consequently, a desired angle of view remains unchanged even if the lens unit is focused after setting the desired angle of view.

Although the invention has been described in its preferred embodiment, the shape and construction of the photovideo camera shown herein are illustrative and not restrictive, and the invention is not limited by any of the details of description, since many changes and variations may be made therein without departing from the scope and spirit thereof.

What is claimed is:

1. A photovideo camera for providing an image signal corresponding to a visible image formed on a developed film comprising:

a film stage for supporting the film;

a main unit containing a lens unit for causing the visible image of the developed film to fall on a solid-state pickup device and electric circuits connected thereto for producing the image signal;

said lens unit comprising a lens barrel, a front lens fixedly held in said lens barrel at a lower end thereof, a zoom lens system held in said lens barrel above said front lens, and a relay lens system held in said lens barrel above said zoom lens system, said relay lens system comprising a front component lens fixedly held in the lens barrel, a rear component lens fixedly held in the upper end of said lens barrel, whereby a focus of the visible image on the solid-state pickup device is achieved without affecting a magnification factor of said zoom lens system; and a column supporting said main unit so that a selected distance is provided between said film stage and the lens surface of said main unit.

2. A photovideo camera according to claim 1, wherein the image pickup means is a solid-state pickup device.

3. A photovideo camera according to claim 2, wherein the solid-state pickup device is a charge coupled device.

4. A photovideo camera according to claim 1, wherein the lens unit includes a zoom lens system.

5. A photovideo camera according to claim 4, wherein the zoom lens system comprises a variator and a compensator.

6. A photovideo camera according to claim 1, wherein the developed film is held between holding elements of a film holder, and the film holder is guided by a guide formed in the film stage.

7. A photovideo camera according to claim 2, further comprising means for rotating, whereby the solid-state pickup device can be turned in a fixed range in a plane parallel to the focal plane thereof.

* * * * *

UNITED STATES PATENT AND TRADEMARK OFFICE
CERTIFICATE OF CORRECTION

PATENT NO. : 5,347,396

DATED : September 13, 1994

INVENTOR(S) : Toshio Tomiyoshi, Tetsuya Yagi, Masami Torizuka, Kenichi Hamano, Mitsuru Hachiya, and Motoshi Mizoguchi It is certified that error appears in the above-indentified patent and that said Letters Patent is hereby corrected as shown below:

Col. 3, line 4, after "changed" insert --,--
Col. 5, line 48, after "focusing" insert --.--

In the Claims:

Col. 6, line 30, after "barrel," insert
--and a master lens disposed for movement along the optical axis in said lens barrel between said front component lens and said rear component lens, only said master lens of said relay lens system being shifted for focusing--

Signed and Sealed this

Sixth Day of June, 1995

Attest:

BRUCE LEHMAN

Attesting Officer

Commissioner of Patents and Trademarks